United States Patent [19]

Jacquin et al.

[11] 4,440,633

[45] Apr. 3, 1984

[54] PROCESS FOR SOLVENT DEASPHALTING HEAVY HYDROCARBON FRACTIONS

[75] Inventors: Yves Jacquin, Sevres; Manuel Gimenez-Coronado, Colombes; Huynh Dai-Nghiã, Rueil Malmaison, all of France

[73] Assignee: Institut Francais du Petrole, Rueil-Malmaison, France

[21] Appl. No.: 373,595

[22] Filed: Apr. 30, 1982

[30] Foreign Application Priority Data

Apr. 30, 1981 [FR] France .................... 81 08837

[51] Int. Cl.³ .................................... C10C 3/08
[52] U.S. Cl. ........................ 208/309; 204/157.1 S; 204/158 S; 204/162 S
[58] Field of Search ............ 208/309; 204/158 S, 204/157.1 S, 162 S

[56] References Cited

U.S. PATENT DOCUMENTS

| 2,010,008 | 8/1935 | Bray | 208/309 |
|---|---|---|---|
| 2,265,762 | 12/1941 | McKittrick et al. | 204/162 S |
| 2,500,757 | 3/1950 | Kiersted, Jr. | 208/304 |
| 2,773,004 | 12/1956 | Martin | 208/309 |
| 2,909,482 | 10/1959 | Williams et al. | 208/309 |
| 2,915,444 | 12/1959 | Doorn et al. | 208/29 |
| 3,003,946 | 10/1961 | Garwin | 208/309 |
| 3,053,751 | 9/1962 | Garwin | 208/309 |
| 3,222,231 | 12/1965 | Markels, Jr. et al. | 204/158 S |
| 3,364,139 | 1/1968 | Campagne et al. | 208/309 |
| 3,414,506 | 12/1968 | Campagne et al. | 208/309 |
| 3,434,967 | 3/1969 | Oldenburg | 208/309 |
| 3,627,675 | 12/1971 | Ditman | 208/309 |
| 3,775,292 | 11/1973 | Watkins | 208/309 |
| 3,830,732 | 8/1974 | Gatsis | 208/309 |
| 4,101,415 | 7/1978 | Crowley | 208/23 |
| 4,324,651 | 4/1982 | Rollman | 208/309 |

FOREIGN PATENT DOCUMENTS

| 1499059 | 1/1954 | Canada | 208/309 |
|---|---|---|---|
| 1005304 | 1/1976 | Japan | 208/309 |

*Primary Examiner*—Delbert E. Gantz
*Assistant Examiner*—Helane E. Maull
*Attorney, Agent, or Firm*—Millen & White

[57] ABSTRACT

Heavy hydrocarbon fractions are made free of asphaltenes and/or resins by extraction with a deasphalting solvent in the presence of ultrasonic radiation.

8 Claims, No Drawings

PROCESS FOR SOLVENT DEASPHALTING HEAVY HYDROCARBON FRACTIONS

BACKGROUND OF THE INVENTION

The invention concerns an improved process for deasphalting or deresining heavy hydrocarbon fractions containing asphaltenes and/or resins, particularly fractions recovered from petroleum, shales or bituminous sands, or obtained from coal conversion.

The heavy oil fractions, or those obtained from coal, boiling above 350° C. (atmospheric residues) or above 550° C. (vacuum residues) contain a number of undesirable components which make their refining difficult. These components are mainly asphaltenes, resins and oil-soluble organometallic compounds containing nickel and vanadium. These organic compounds are destroyed in the hydrorefining operations conducted with hydrogen in the presence of catalysts belonging chiefly to groups Vb, VIb and VIII of the periodical classification. The nickel and vanadium compounds foul the catalysts and contribute to their quick deactivation.

For analysis purposes, the following definitions are commonly accepted:

Asphaltene means the hydrocarbon fraction which precipitates when n-heptane is added, under the standard conditions of NFT 60.115.

Resin means the fraction which precipitates when propane is added after previous removal of the asphaltenes.

However, in practice, when purifying heavy hydrocarbon fractions, solvents are used which precipitate not only the asphaltenes but also the resins, in part or in totality. This is the case, for example, of hydrocarbons having 3 to 6 carbon atoms.

In the following description, deasphalting means any operation wherein asphaltene or an asphaltene+resin mixture carrying along therewith a variable proportion of oil, is separated, the separated fraction being designated as "asphalt" for sake of brevity, as is usual in the industry.

It is well-known today that the asphaltenes contain the major part of the nickel and vanadium compounds present in the heavy oils. In a typical case, 80% of the (Ni+V) compounds contained in the heavy oil fraction are present in the "asphaltene" fraction. The remainder of the organometallic compounds is associated with the fraction identified as "resin".

A well known method to catalytically refine and hydropurify (hydrodesulfurize, hydrogenate, hydrodeoxygenate, hydrodenitrogenate) heavy fractions consists, in a first step, called a solvent deasphalting step, of eliminating the asphaltenes and a fraction of the resins (thus also the metals) by precipitating them by addition of an appropriate solvent, and then, in a second step, of hydrotreating the fraction freed from the asphaltenes and from a large portion of the resins and metals. The deasphalting operation, called solvent deasphalting, yields an asphaltene-free refined fraction containing a portion of the resins and having a low content of metals, which fraction will be called D.A.O. (deasphalted oil), and a concentrated asphaltene fraction also containing resins and oils, which will be called asphalt. The asphalt fraction, wherein all the products detrimental to refining have concentrated, cannot be utilized easily since it has not only high nickel and vanadium contents but also very high sulfur and nitrogen contents.

The economics of the so-called deasphalting process necessitate that the asphalt fraction represent a low portion of the total weight of the heavy oil fraction. To obtain this result, a relatively heavy paraffin is used as precipitation solvent. It is well known that the yield of precipitate (asphalt) decreases, everything else being unchanged, when the molecular weight of the precipitation solvent increases. The known processes preferably make use of pentane or a light gasoline as precipitation solvent.

The second characteristic feature of such a process is the ratio of the proportions of precipitation solvent and heavy fraction to purify. Since the solvent is recovered by distillation and recycled, the lower the solvent to oil ratio, the better the economics of the process.

The last important element for the expected result consists of contacting the solvent with the heavy fraction as intimately as possible. Various devices are conventionally used therefor: counter-current extraction columns provided with fixed internal walls or discs improving the contact, or better with internal moving walls or discs, as for example, the device called R D C (rotating disc contactor). In other known installations the solvent and the oil are contacted co-currently, a settler or optionally a battery of mixers-decanters being used thereafter.

Irrespective of which of the above technical solutions is selected, it is observed that the percentage of asphalt separated is far higher than the asphaltene percentage in the treated charge. When analyzing the asphalt, it is found that, in all cases corresponding to conventional techniques, the asphalt contains an oil fraction amounting to 15 to 35% by weight of the separated asphalt.

Deasphalting comprises a double operation: the dissolution of the oil into the "precipitation solvent" and the precipitation of the asphaltenes and a fraction of the resins. The presence of substantial amounts of oil in the asphalt is indicative of a poor dissolution of the oil into the solvent. A portion of the latter is carried away when precipitating the alphaltenes and the resins.

SUMMARY OF THE INVENTION

It has been found that the result of the deasphalting operation can be improved by subjecting the mixture of the precipitation solvent with the heavy fraction to the effect of ultrasonic waves.

DETAILED DISCUSSION

When examining the effect of adding a heavy fraction to, for example, heptane, used as the precipitation solvent, the formation of a cloud, observed as soon as the heavy fraction has been added, is followed by the formation of globular asphalt droplets which tend to adhere to the walls of the enclosure. These droplets are then out of contact with the solvent which is therefore unable to extract the oil trapped at the center of the so-formed droplets.

When repeating the same experiment in an ultrasonic enclosure, instead of contacting the solvent with the heavy fraction according to the above conventional means, it is found that:

as long as the ultrasonic field is maintained, the precipitate remains dispersed in the solvent;
the droplets adhering to the walls are made soluble;
the liquid and its free surface are subjected to an intense stirring resulting in a temperature increase of at least 1° C. and which sometimes can attain 30° C. or more.

after the ultrasonic field has been turned off, the asphalt settles easily and the oil yield is higher than that obtained by conventional means.

The process of the invention is characterized in that, in a first step, the admixing of the heavy fraction with the precipitation solvent is performed in a contact zone, at least a portion of which is subjected to ultrasonic radiation, and, in a second step, an asphalt fraction is separated from a deasphalted oil fraction.

The admixing can be effected in a counter-current column, the heavy fraction being supplied to the intermediate part of the column and the solvent to the bottom of the column; the extracted fraction is discharged from the top of the column (solvent+oil) and asphalt-+solvent from the bottom thereof. The fluids circulating in the column are subjected, over the whole length of the column or over only a part thereof, to the action of an ultrasonic field obtained, for example, with two metal plates mechanically and electrically isolated from the structure of the column and arranged parallel to each other so as to concentrate the vibration field in the space located between these plates. The plates are provided with a device for generating ultrasonic waves, such as, for example, piezoelectric exciter crystals provided with a source of alternating current of ultrasonic frequency.

In a preferred embodiment, the precipitation solvent and the heavy fraction are admixed in-line and are passed through at least one field of ultrasonic vibrations whose source may be of any type. At the outlet of the ultrasonic chamber, the mixture is fed to one or more settlers arranged in a cascade, or to a hydrocyclone, a centrifuge, or generally to any appropriate apparatus for separating a heavy phase essentially containing asphalt and a portion of the solvent from a lighter phase containing the oil and another portion of the solvent. After separation of these two phases, the solvents are removed, for example by distillation, and recycled by any convenient means to the first step of mixing in-line. The residence time in the ultrasonic field is, for example, from 30 seconds to 30 minutes.

The temperature increase within the heavy fraction-solvent mixture shows the effect of the ultrasonic waves on the suspended particles and the efficiency of the so-obtained stirring. It has been found that the desired effect is obtained with an ultrasonic power able to raise the temperature by at least 1 degree Celsius during the residence in the ultrasonic enclosure.

Ultrasonic vibrations mean vibrations of a frequency higher than 20,000 hertz, for example 50,000 hertz, which are not detectable by the human ear. Similar effects may be obtained at frequencies higher than 10,000 hertz, but they have the disadvantage of being audible and unpleasant to the operators. For this reason, frequencies of at least 20,000 hertz are preferred, although any sonic frequency able to homogenize the suspensions can be used according to the invention. The frequencies can be as high as 100,000 hertz or even higher.

As a rule, one single contact stage is sufficient for the desired asphalt production. It may be advantageous to serially associate several contact stages, at least one of which comprises an ultrasonic generator. In these series of stages, the fraction of high asphalt content discharged from a first contact stage is supplied to a second stage where it is contacted again with precipitation solvent or with a mixture containing more than 10% by volume of precipitation solvent; the remainder of the mixture then consists, for example, of the hydrocarbons dissolved in the preceding stage.

The above description can also be applied to deresining, the latter differing from deasphalting only by the selection of an already deasphalted charge and the use of a different solvent.

The precipitation solvent can be any solvent already known for this use, particularly an aliphatic hydrocarbon or a mixture of aliphatic hydrocarbons with 3 to 7 carbon atoms, or an aliphatic alcohol or a mixture of aliphatic alcohols with 3 to 10 carbon atoms; the carbon skeleton of the hydrocarbons and alcohols may be linear or branched.

The operating conditions, particularly the temperature, pressure and solvent proportion are those already known for operations of this type.

EXAMPLE 1

The advantages of the invention are shown by the use of an atmospheric residue from Kuweit, the asphalt of which is separated by means of normal heptane as precipitation solvent. Stirring is performed by different methods. The experiment has been conducted with the use of an atmospheric residue selected as being a sufficiently fluid heavy material to operate at room temperature (20° C.). The experiments are thus made easier although being fully conclusive.

The characteristics of the atmospheric residue from Kuweit are the following:

Initial point of distillation: 350° C.

$d = 0.960$ asphaltenes with $C_7$:2.7% (standard NFT 60 115).

The experiment has been performed with centrifuge tubes ref. 00268 for Sorvall centrifuge (Du Pont). 25 g of the Kuweit residue are introduced in these tubes, followed with 100 g of normal heptane. The contact between the solvent and the heavy fraction has been performed according to three different methods:

An extraction conducted in an apparatus of large size can be simulated by performing an experiment equivalent to one extraction stage. The contact time is sufficient to attain the equilibrium, as shown by operating with twice the contact time. The tubes are placed on an oscillating rocker (90 oscillations per minute). A first tube is taken up after 1 hour of stirring, and a second one after 2 hours. The tubes are placed in a Sorvall centrifuge and centrifuged at 4000 rpm for 10 minutes. The supernatant phase is then withdrawn and the deposits are dried in vacuum at 100° C. for 3 hours and then weighed. The asphalt percentage is calculated as follows:

$$\% \text{ asphalt} = \frac{\text{weight of the dry deposit}}{\text{weight of the initial heavy fraction}}$$

A more efficient contact is obtained, in a second series of experiments, by performing the contact operation with a stirrer of the Brookfield Engineering Laboratories trade mark, provided with two concentric shafts on which are mounted two concentric helices of opposite pitches. Stirring is conducted at 1000 rpm for 20 minutes. The asphalt is then separated as described above.

The operation is finally conducted according to one of the embodiments of the invention. The heptane-atmospheric residue mixture is placed in an ultrasonic enclosure filled with water. The apparatus is operated for 10 minutes. The temperature increase of the sample is 3° C. After a few minutes, the free surface of the liquid in the flask is strongly agitated with formation of an aerosol. The flask is then corked and the experiment is continued. The total time is 10 minutes. Asphalt is then separated as above.

The results are given in Table I.

TABLE I

Heavy Fraction: A 350° C.+ residue from Kuweit.
Extraction with n-heptane.
Ratio solvent/oil to be extracted: 4 kg/kg.

| Stirring mode | Time | % asphalt |
|---|---|---|
| Oscillating rocker | | |
| 90 osc./mn | 1 hour | 14 |
| 90 osc./mn | 2 hours | 12 |
| Stirrer with two helices of opposite pitches | 20 minutes | 7.6 |
| Ultrasonic waves | 10 minutes | 6.8 |

It is found that the ultrasonic stirrer has a better extraction efficiency than the conventional mechanical stirrers, even with a reduced stirring time. It is found that the deposits which adhere to the walls of the centrifuge tube are very important when operating with the oscillating rocker and are not so important when stirring with the double helix; with the ultrasonic stirring, there is obtained a suspension of homogeneous aspect before centrifugation. In all cases, it is found that the dissolved fraction does not contain asphaltenes. The decrease of the asphalt yield results from a better extraction selectivity. The asphalt fraction cannot be upgraded easily so that the economics of the process are substantially improved.

Heptane can be separated from the deasphalted fraction by distillation.

EXAMPLE 2 (comparison)

The following experiment is conducted to prove the advantage of the multi-stage operation and determine its efficiency, as compared with a single stage.

4 g of Kuweit vacuum residue and 10 g of normal heptane are introduced into each of twelve glass centrifuge tubes. The tubes are corked and quick stirring is performed by introducing a metal ball into each tube and stirring for 10 minutes in a stirring apparatus of the vortex type. At the end of the stirring, the balls are recovered with a magnet and the tubes are centrifuged for 20 minutes at 5000 rpm. The upper liquid phase is withdrawn. Two tubes are used to determine the proportion of asphalt after drying. The other ten are filled with 10 g of fresh heptane and stirring is renewed according to the above proceedings. Three extraction stages are thus constituted; at each time, two tubes are removed to determine the remaining proportion of asphalt. The results are given in Table II.

TABLE II

| Stage | Solvent/oil ratio in the stage weight/weight | Total Solvent/oil ratio weight/weight | % remaining asphalt by weight |
|---|---|---|---|
| 1 | 2.5 | 2.5 | 24.5 |
| 2 | 2.5 | 5 | 10.7 |
| 3 | 2.5 | 7.5 | 5 |

It is found that the multi-stage extraction is more efficient than the single stage extraction. On the other hand, more than two stages and a higher solvent/oil ratio are required to obtain the same efficiency as with a single stage with ultrasonic stirring according to the invention.

EXAMPLE 3

Multi-stage tests are performed to show, under similar conditions, the improvement obtained by the invention, stirring being performed with an oscillating rocker or with ultrasonic waves. The heavy fraction is a gasoline-free Boscan crude diluted with 20% by weight of atmospheric gas oil (240°–350° C.) selected as being a product sufficiently fluid to avoid heating.

The characteristics of the heavy fraction are:
Boscan crude diluted with 20% of atmospheric gas oil
d=0.980
asphaltene: 10.8% b.w.
initial distillation point: 140° C.
25% by volume: 350° C.

The tests have been performed according to the methods shown in the above examples. The results obtained are given in Table III. In all cases the deasphalted fraction was asphaltene-free.

TABLE III

| | | | % asphalt b.w. | |
|---|---|---|---|---|
| Stage | Solvent/oil ratio in the stage b.w. | Total Solvent/oil ratio b.w. | stirring with ultrasonic stirring 10 minutes | stirring with oscillating rocker 1 hour |
| 1 | 4 | 4 | 21.6 (ΔT = 3° C.) | 41.2 |
| 2 | 4 | 8 | 14 (ΔT = 4° C.) | 18.5 |

EXAMPLE 4

Settling can be obtained with various solvents. Experiments are performed under the conditions of example 1 with two solvents: normal pentane and isopropyl alcohol (ΔT=4° C.).

It is found that the improvement obtained with the method of the invention is also obtained with solvents other than heptane (Table IV).

TABLE IV

| | % asphalt (b.w.) | |
|---|---|---|
| Stirring | Solvent: n C$_5$ Solvent/oil ratio = 5 b.w. | Solvent: isopropyl alcohol solvent/oil ratio = 5 b.w. |
| oscillating rocker 1 hour | 24 | 22 |
| ultrasonic 10 minutes | 18 | 16 |

Here again the deasphalted fraction was asphaltene-free.

EXAMPLE 5

The fraction solubilized in heptane of example 1 is collected, heptane is evaporated and the deasphalted atmospheric residue obtained is diluted with isopropyl alcohol at a rate of 4 parts of alcohol per part of the deasphalted residue. The mixture is subjected to ultrasonic waves for 15 minutes; the temperature of the mixture increases by 5° C. After decantation by centrifugation and drying, there is obtained a resin precipitate amounting to 14% b.w. of the deasphalted residue. The vacumm residue thus made free of resin has a substantially improved aspect and color.

The deasphalted and/or deresined oil fractions obtained by the present process may find a number of uses: they constitute, for example, an excellent charge for a hydrorefining or catalytic cracking process; they also constitute an excellent base for lubricating oil, particularly when propane has been used as deasphalting agent.

The present process is also applicable to the treatment of effluents from hydrodemetallation units whose charges contain asphaltenes and which operate with soluble or dispersed catalysts based on metal compounds, for example vanadium, molybdenum, tungsten, nickel and/or cobalt compounds; at the end of the hydrodemetallation, the treatment of the invention is applied to remove not only asphaltenes and/or resins but also catalyst residues which appear in most of cases as very fine solids or muds.

What is claimed is:

1. In a process for deasphalting a heavy hydrocarbon fraction containing asphaltenes, comprising the step of admixing said fraction with a deasphalting solvent, thereby forming a first liquid phase, being a hydrocarbons solution in said solvent and having a reduced asphaltene content, and a second liquid phase, being an asphalt fraction having an increased asphaltene content; separating said first and second liquid phases; and removing the solvent from said first liquid phase and recovering the resultant deasphalted oil, the improvement wherein said admixing is effected in a contact zone, at least a portion of which is subjected to ultrasonic radiation.

2. A process according to claim 1, wherein the ultrasonic radiation has sufficient energy to increase by at least 1° C. the temperature of the deasphalting contact zone.

3. A process according to claim 1, wherein the ultrasonic radiation has a frequency higher than 10,000 hertz.

4. A process according to claim 3, wherein the ultrasonic radiation has a frequency higher than 20,000 hertz.

5. A process according to claim 1, wherein the deasphalting solvent is pentane or a light gasoline fraction comprising $C_{4-7}$ hydrocarbons.

6. A process according to claim 1, wherein the deasphalting solvent is propane.

7. A process according to claim 1, wherein the heavy hydrocarbon fraction contains catalyst residues in addition to asphaltenes.

8. A process according to claim 1, wherein the residence time of the admixture in the portion of the contact zone which is subjected to ultrasonic radiation is from 30 seconds to 30 minutes.

* * * * *